March 13, 1945. R. H. NEWTON 2,371,181
CATALYTIC HYDROCARBON CONVERSION PROCESS
Filed July 18, 1942
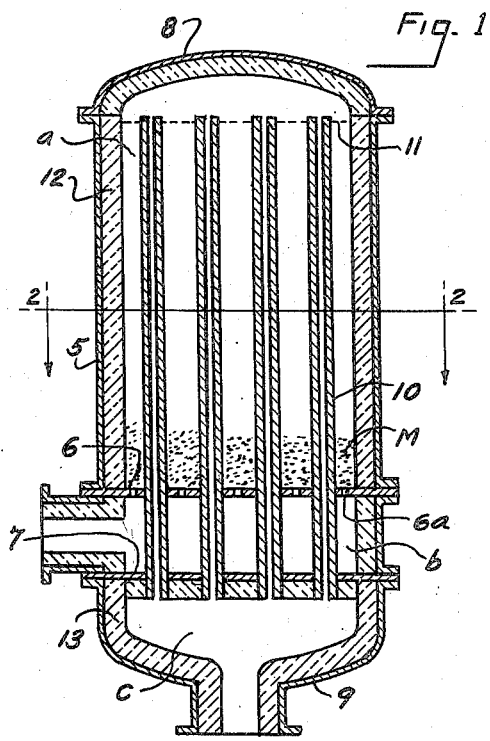
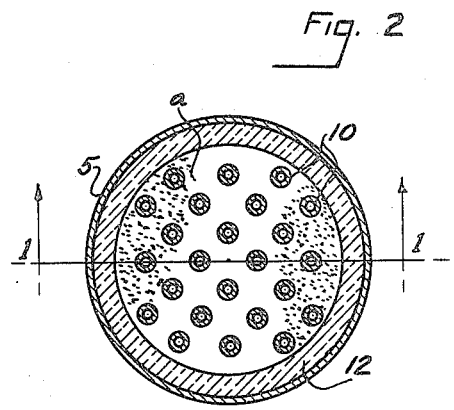
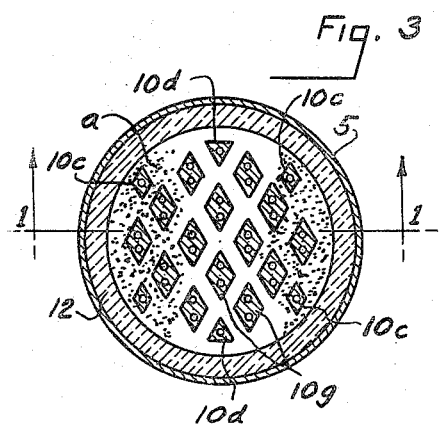
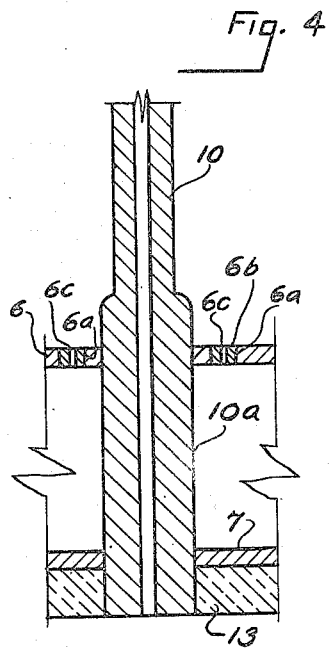
INVENTOR
ROGER H. NEWTON
BY
Ira L. Nickerson
ATTORNEY Patented Mar. 13, 1945

2,371,181

UNITED STATES PATENT OFFICE 2,371,181

CATALYTIC HYDROCARBON CONVERSION PROCESS

Roger H. Newton, Bowling Green, Pa., assignor to Houdry Process Corporation, Wilmington, Del., a corporation of Delaware Application July 18, 1942, Serial No. 451,403

1 Claim. (Cl. 196—52)

This invention relates to chemical reactions effected in the presence or with the aid of contact masses having adsorptive and/or absorptive qualities. More particularly it is concerned with apparatus for conducting and controlling catalytic operations without requiring an extraneous heat exchange medium to be circulated for the purpose of adding heat to or removing heat from the contact mass. In certain respects it may be considered as an improvement on or further simplification of apparatus for carrying out a regenerative cycle such as is disclosed in Patent No. 2,161,676 issued June 6, 1939, to E. J. Houdry.

In converting or treating hydrocarbons with solid contact material, most reactions produce a contaminating deposit on the catalyst which impairs its action and which must be removed if the catalyst is to continue in use. Controlled oxidation is generally utilized to free the catalyst of such deposits. For example, in the catalytic cracking of petroleum it is usually necessary to remove heat from the catalyst during regeneration since the heat of combustion of the coky deposit exceeds the endothermic heat of the cracking reaction. It is essential, however, that the regenerating medium be furnished to the catalyst at 700° F., or above, for properly burning off the deposit. It is also important that no portion of the reaction chamber of the converter or connections thereto be allowed to cool below the dew point of the hydrocarbon charge. Thus, there is a definite limitation in the amount of heat to be removed from the catalyst or contact mass since the incoming charge of hydrocarbon vapors for a cracking operation must be at least 750° to 800° F. and the outgoing hydrocarbon products should not exceed a maximum permissible cracking temperature of about 950° to 1000° F.

One object of the invention is to control and direct the excess heat of the regenerating reaction. Another object is to provide relatively simple and inexpensive apparatus for this purpose. Other and related objects will be apparent from the detailed description which follows.

The invention involves a type of converter adapted to use a cold or cool regenerating medium, and, whenever the dew point of the charging stock permits, a lowered inlet temperature for the charge. For cold or cool reactants an insulated inlet chamber is provided which communicates with the remote end of the reaction chamber by suitable conducting means of sufficient heat capacity and conductivity to prevent the cooling of any part thereof or of the adjacent contact mass below the dew point of the hydrocarbon charge during on-stream operations and to preheat the air or other regenerating medium to at least 700° F., and preferably somewhat higher, before it contacts the catalyst. The conducting means are heavy walled elements or tubes which occupy between 20 and 50% of the cross sectional area of the reaction chamber. The openings or bores in the elements for the passage of reactants or reaction products, as the case may be, take up not more than 10% of the cross sectional area of the reaction chamber and preferably about 5% of such area. This gives a net catalyst volume between 40 and 70% of the volume of the reaction chamber. Usually the cross sectional area of the heat and fluid conducting elements or tubes is between 25 and 40% of the reaction chamber.

Illustrative embodiments of the invention are shown in the accompanying drawing in which:

Fig. 1 is a vertical sectional view of a converter substantially on the line 1—1 of Fig. 2 or Fig. 3;

Fig. 2 is a transverse sectional view on the line 2—2 of Fig. 1;

Fig. 3 is a sectional view similar to Fig. 2 showing a modified form of heat and fluid conducting elements; and Fig. 4 is an enlarged detail vertical sectional view showing still another modification of the heat and fluid conducting elements.

In Fig. 1 the converter comprises a metal casing 5 of cylindrical or other appropriate form which has at its lower portion an apertured transverse partition 6 and spaced therebelow a second transverse partition 7. The upper end of the converter casing is closed by a shallow dished closure member 8 and the lower end by a domed closure member 9, with the result that the interior of the converter comprises a large reaction chamber $a$, defined by upper closure 8 and partition 6, a manifolding chamber $b$, defined by partitions 6 and 7, and a manifolding chamber $c$ defined by partition 7 and lower domed closure 9. Communication is established between manifolding chamber $c$ and the remote or uppermost end of the reaction chamber $a$ by massive heat conducting and fluid conducting elements or tubes 10, mounted in suitable apertures therefor in transverse partitions 6 and 7. These elements 10 are disposed to form a uniform and symmetrical pattern within the reaction chamber, as is apparent from Fig. 2. They comprise the only series of conduits within the converter. Reaction chamber $a$ also communicates with manifolding chamber $b$ by suitable apertures $6a$, which, as indicated in Fig. 4, may have buttons 8b mounted therein of corrosion and erosion resistant material, provided with metering orifices 6c of smaller size than the fragments or molded pieces of catalytic material making up the contact mass M which fills the reaction chamber a to a point indicated by broken line 11 just below the open upper ends of tubular elements 10.

The inner walls of casing a, including closure member 8, but excluding transverse partition 6, are protected by a layer of heat insulating material 12 which may be lined with a thin metal cover, if desired. The entire inner walls of manifolding chamber c, including the lower face of transverse partition 7, are covered with a similar layer of heat insulating material 13, which may also be covered with metal to prevent absorption of reactants by the insulating material. The entire exterior of the converter may also be covered by heat insulating material (not shown).

Any known or desired form of contact material may be utilized in reaction chamber a. For cracking operations silicious catalysts are useful, especially compounds of silica with some other metallic compound, as for example, silica-alumina, silica-zirconia, silica-alumina-zirconia, etc. For dehydrogenating operations the usual dehydrogenating catalysts may be utilized, such as compounds of chromium, molybdenum, vanadium, etc., either alone or on suitable carriers which may be silicious. When elements 10 are not of sufficient heat capacity to absorb the heat liberated during the regenerative part of the cycle, the catalytic mass may be diluted by a suitable quantity of inert or substantially inert material to supply the additional needed storage capacity. Suitable inert materials which are commercially available for this purpose are fused alumina, magnesite brick or ore, chrome brick, silica brick, fire clay brick, ganister, etc., and additional materials may be readily prepared, as by mixing bentonite and kaolin and/or other ingredients in suitable proportions, extruding and baking the same to form fragments or pellets of about the size of the catalytic material. Still another expedient to secure increased heat capacity and heat control is to provide the heat storage and conducting elements 10 with fins (not shown) which radiate into the contact mass in known manner.

In operation, both the on-stream and regenerative reactants are preferably charged to the converter through insulated manifolding chamber c, and pass through the relatively small openings or bores in elements 10, where they pick up heat so as to enter the upper end of the reaction chamber a at reaction temperature. They then pass downwardly into and through the catalytic mass and out through apertures 6a into manifolding chamber b, whence they leave the converter. During on-stream operations the members 10 retain sufficient heat not only to supply any deficiencies in the inlet temperature of the reactants on entering manifolding chamber c, but also give up sufficient heat to the contact mass M to supply the heat of reaction during the on-stream or productive reaction of the cycle. The heat thus expended during the on-stream reaction, which is endothermic, is regained during the subsequent regeneration or burning of the deposits on contact mass M, which heat is absorbed by members 10, and due to the heat conductivity of these members, is conveyed downwardly to partitions 6 and 7 and a portion of this heat is given up to the regenerating medium which is supplied to manifolding chamber c at a temperature sufficiently below the reaction temperature to absorb excess heat. The heat capacity and heat conductivity of members 10 is such, however, that at no time is the temperature of the lower end of these members more than 50° below that obtaining in reaction chamber a.

The enlarged detail showing in Fig. 4 illustrates a modification of elements 10 in which the lower portions, at least the parts extending through partitions 6 and 7, are enlarged to insure adequate conduction of heat to the vital area adjacent lower partition 7 since the entrance of the reactants into elements 10 is the critical place to which heat must be brought to insure the maintenance of the charge above its dew point and to avoid undue cooling of the lower portion of the contact mass. This enlarged portion 10a gives adequate heat storage capacity where the greatest quantity of heat is given up to the incoming reactants.

Fig. 3 illustrates a modified form of heat storage and fluid conducting elements, at least for the portions which extend within reaction chamber a. As illustrated, the elements 10b in the central area are diamond shaped and those in the peripheral areas are either diamond shaped but smaller, as indicated at 10c, or triangular, as indicated at 10d, the purpose being to provide a uniform thickness or depth of contact mass between the elements so as to insure uniform temperature control of the entire contact mass M. The large diamond shaped elements have two small openings or bores therethrough from end to end, to conduct the reactants to the upper end of the reaction chamber, and the peripheral elements 10c and 10d of reduced size have a single opening or bore therethrough.

The tubular, or other shaped, heat and fluid conducting members may be of any known or desired materials which have sufficient heat capacity and heat conductivity for the purpose intended. They will usually be of metal. Iron is a suitable material, but since iron oxide is highly detrimental to most catalytic operations, elements formed of iron should be calorized or should have all surfaces protected against oxidation as by calorizing, chrome plating, etc. Alloys resistant to corrosion and oxidation are suitable, such as chrome and chrome nickel steels. Compressed graphite is also suitable when the operations are controlled so that temperatures within the reaction chamber are below 1100° F. When the conducting elements are formed with a heavier or enlarged area at the lower ends, as in Fig. 4, the heavier portion may be of the same or different material. When a different material is used it is preferably one of higher conductivity, such as silver, copper, aluminum, etc., or alloys containing such metals. The bores which extend through the members 10, 10a, 10b, 10c and 10d from end to end are small so as to insure quick and adequate pick up of heat by the reactants passing therethrough and, in addition, to give high velocities so as to avoid, in the case of hydrocarbon reactants, the deposition of coke within the elements.

In one embodiment of the invention 1" xx heavy iron pipe calorized (0.6" inside diameter and 1.37" outside diameter) was used for the heat and fluid conducting elements 10, the pipes being mounted on 2" triangular centers to provide a length of path of at least 30" through the contact mass within the reaction chamber. The flow of hydrocarbon charge, as well as of the air used as the regenerating medium, was in the same direction, namely, from manifolding chamber $c$ through the heat storage and conducting elements or conduits to the upper end of the reaction chamber $a$, through contact mass M, through apertures $6a$ in transverse partition 6, thence into manifolding chamber $b$ and out of the converter; although the hydrocarbon reactants could have been charged, if at reaction temperature in the reverse direction, as first into manifolding chamber $b$, thence through contact mass M, down through elements 10 and out of the converter through manifolding chamber $c$. By preference, all reactants are charged to manifolding chamber $c$. In case of heavy oils to be cracked or dehydrogenated, the oil will be charged in vapor form to chamber $c$ above its dew point, as at 800° F. or above, and will leave the reaction chamber to enter manifolding chamber $b$ in the temperature range of 900 to 1000° F. For the regenerating reaction air may be charged to manifolding chamber $c$ at a temperature as low as 200° F. to leave the upper ends of the elements in the temperature range of 700 to 850° F. and to leave the reaction chamber in the range of 900° to 1000° F. With lighter oils the entering temperature of the oil vapors may be lower than 800° F. and in the case of naphthas may be as low as 300 to 400° F.

I claim as my invention:

The process of conducting catalytic hydrocarbon conversion reactions in which a fixed bed of catalyst is employed and in which hydrocarbon reactants and regeneration gas are alternately fed to the bed of catalyst, which process comprises the steps of introducing said reactants and gas into the ends of tubes embedded within said bed of catalyst, said ends being positioned at one end of said bed of catalyst, flowing said reactants and gas through said tubes in indirect heat exchange relation with said bed, discharging said reactants, after flow through said tubes, at the other end of said bed of catalyst, flowing said reactants and gas through said bed of catalyst to the first mentioned end of said bed, and there discharging said reactants and said gas from said bed, utilizing heat stored in said tubes during feeding of regeneration gas to supply heat for heating hydrocarbon reactants in said tubes during feeding of said hydrocarbon reactants, and limiting swing of the temperature of said tubes so that it does not fall more than 50° F. below the average temperature of said catalyst, by employing tubes which occupy between 20% and 50% of the cross sectional area of the catalyst bed, the total bore area of which tubes occupies not over 10% of said cross sectional area.

ROGER H. NEWTON.